United States Patent
Itoh et al.

(10) Patent No.: US 6,205,427 B1
(45) Date of Patent: Mar. 20, 2001

(54) VOICE OUTPUT APPARATUS AND A METHOD THEREOF

(75) Inventors: Takashi Itoh, Yamato; Chieko Asakawa, Kawasaki, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/114,802

(22) Filed: Jul. 13, 1998

(30) Foreign Application Priority Data

Aug. 27, 1997 (JP) .................................................. 9-230714

(51) Int. Cl.[7] .................................................. G10L 13/00
(52) U.S. Cl. ............................ 704/260; 704/258; 704/266
(58) Field of Search .................................. 704/258, 259, 704/260, 266

(56) References Cited

U.S. PATENT DOCUMENTS

| | | | |
|---|---|---|---|
| 4,817,161 | * 3/1989 | Kaneko | 704/258 |
| 5,500,919 | * 3/1996 | Luther | 704/260 |
| 5,850,629 | * 12/1998 | Holm et al. | 704/260 |
| 5,873,059 | * 2/1999 | Iijima et al. | 704/207 |
| 5,890,117 | * 3/1999 | Silverman | 704/260 |

* cited by examiner

Primary Examiner—David R. Hudspeth
Assistant Examiner—Daniel Abebe
(74) Attorney, Agent, or Firm—Robert P. Tassinari, Jr.

(57) ABSTRACT

When a user depresses a normal mode key 180 of a key pad 18 the computer 16 provides a voice signal which reads text data aloud at a normal speed (for example, a speed at which an announcer reads aloud news in radio broadcasting). When the user depresses a fast feed mode key 182, the computer 16 converts only a section of the text data at a speed (1.5 to 3 times the normal speed) which will enable the user to understand the content to a voice signal. other sections (skipping section) are converted to a voice signal of a speed (skipping speed, 3 or more times the normal speed) at which the user can grasp at least the length and the tome of the text data regardless of whether or not it is audible to the user.

18 Claims, 5 Drawing Sheets

FIG. 2

FIG. 3A

VOICE OUTPUT APPARATUS AND A METHOD THEREOF

FIELD OF THE INVENTION

This invention relates to a voice output apparatus and a method thereof in which the leading portion of each of a plurality of sentences included in text data is converted to a voice output at a speed at which the data content is understandable to a user while converting other portions to a voice output at a faster speed to enable the user listening to the voice output to quickly grasp the content of a sentence with a feel of quickly reading the sentence.

BACKGROUND OF THE INVENTION

Text voice synthesizing apparatus has been used in the prior art for converting text data to a voice signal to read aloud the content. In order to read the content of the text data quickly with such apparatus, a method of converting the text data to a voice signal faster than a normal speed is employed. In this method, however, the faster the reading of the text data by the voice, the more difficult it is to follow the data content. Specifically, it is very difficult to follow the data content once the text data is read about 3 times or more as fast as conventional radio broadcasting. (This depends on the degree of training of the listener.)

Another method is to convert only a portion of the text data to a voice signal while skipping other portions. In this method, however, the listener cannot grasp the length of the skipped portion of the text data. For example, the listener cannot determine which portion of the text data is being read. In addition, since portions of the text data is not be read aloud at all, in that that portion cannot be read aloud again at an audible speed.

Such inexperience impedes, for example, a blind person from grasping the content of text data using text synthesizing apparatus to quickly "read" a document.

Converting digital data to a voices signals is disclosed, in PUPA8-83089, PUPA6-308998, PUPA7-69715, PUPA9-50294, PUPA8-171395, PUPA6-337976, PUPA6-35913, PUPA5-265695, PUPA4-268631, PUPA4-199420, PUPA1-88599, PUPA63-62032, PUPA62-219066, PUPA62-156730, PUPA61-43778, PUPA7-152532, PUPA4-51099 and PUPA8-191254.

However, none of the methods described in these references provides a sufficient capability of reading aloud the content of text data in a short time in a manner it can be followed while supporting a listener's ability to grasp the content of the text data.

Therefore, it is an object of this invention to provide voice output apparatus and method which provides a sufficient capability of reading aloud the content of text data in a short time in a manner that can be followed while supporting a listener's ability to grasp the content of the text data.

It is another object of this invention to provide voice output apparatus and method which is capable of having a listener grasp which portion of text data is read aloud at the time when the text data is read aloud for a short time while giving the listener the ability to repeat listening important portions of text data.

It is a further object of this invention to provide voice output apparatus and method which enables a blind person to grasp the content of text data as if normally sighted

BRIEF DESCRIPTION OF THE INVENTION

To achieve the above described objects, the voice output apparatus of this invention comprises dividing text data into a plurality of sections and converting each of said plurality of sections to a voice signal at different speeds.

Preferably, the dividing means divides text data into one or more first and second section(s) and said voice output means converts the first section(s) of the divided text data to a voice signal of a first speed while converting said second section(s) of said divided text data to a voice signal of a second speed which is faster than said first speed.

Preferably, the text data comprises character strings of data and boundary data indicating the boundary between the character strings and said dividing means divides the text data at the portion of the boundary data into the plurality of character strings of data and further divides said plurality of divided character strings of data into the first section(s) and the second section(s).

Preferably, the dividing means divides a predetermined portion from the beginning of each of the plurality of divided character strings of data into the first section(s) and divides a portion other than the predetermined portion from the beginning of each of the plurality of divided character string of data into the second section(s).

Preferably, the voice output means converts at least the first section(s) of the text data to a voice signal at an audible first speed.

In converting text data to a voice signal, the voice output apparatus of this invention divides the text data at the portion punctuating the sentence such as a punctuation mark, a space and a carrier return and converts a predetermined range (the first section) from the top of each divided text data to a voice signal at the slow first speed at which a listener can easily follow for outputting while converting the other portion (second section) to a voice signal at a speed which is a high (not necessarily audible) speed), but still allows the listener to grasp the length of the text.

In this invention, the dividing means divides the text data at a symbol, such as a punctuation mark, indicating a delineation (boundary of character string) of a sentence, into a plurality of character strings of data (beside data indicating characters, data indicating a symbol is included when, for example, data indicating a punctuation "," of the text data is voice outputted as "comma").

Further, the dividing means divides a leading few seconds portion of each character string resulting from the division into the first section which is voiced so that the content is audible while dividing a portion of the character string other than the first section into the second section which is voiced at a faster speed.

The voice output means converts the first section of each character string resulting from the division of the text data by the dividing means to a voice signal at a speed which is, for example, same as the speed at which a sentence is read aloud in a conventional radio broadcasting or a speed which is high but low enough to allow a listener to easily follow the content. By providing the first section of the voice signal in this manner, the listener can grasp the content of the sentence of the text data as if the sentence is quickly read.

Further, the voice output means converts the second section of each character string resulting from the division of the text data by the dividing means to a voice signal at a speed (not necessarily audible) which a listener can grasp the length, and the tone of the voice signal reading aloud this section. By providing a voice signal of the second section in such a manner, allows the listener to catch the rhythm or atmosphere of the sentence in the text data thereby providing the listener with a hint to replay important portions with an audible voice signal.

A computer readable recording medium of this invention records therein a program to cause a computer to execute a step of dividing text data into a plurality of sections and a step of converting each of said plurality of sections at least to a voice signal of a speed differing from other sections.

DETAILED DESCRIPTION OF THE INVENTION

Figure 1:
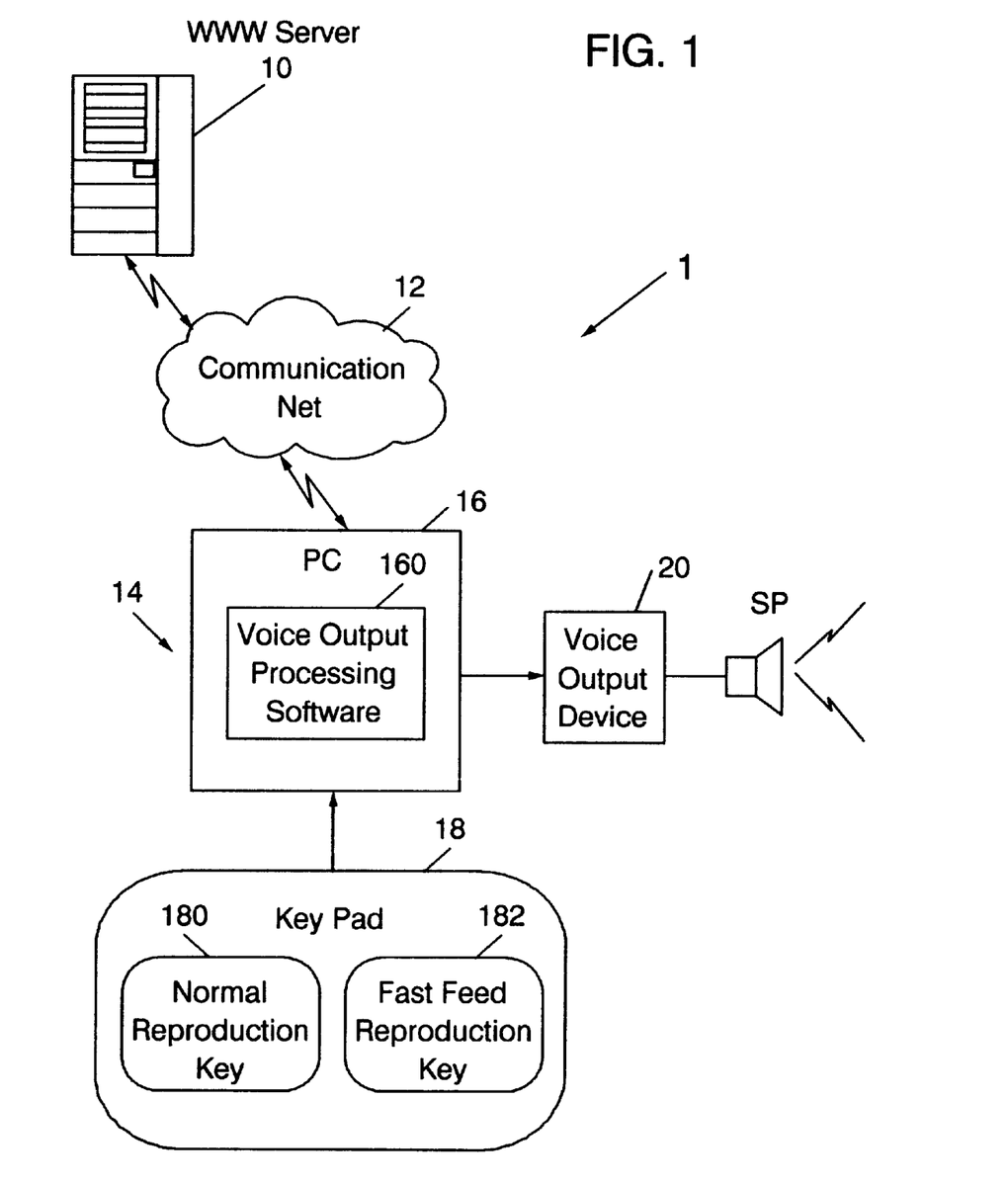
FIG. 1 is a diagram showing an example of the configuration of a network system to which the voice output method of this invention is applied.

As shown in FIG. 1, the network system 1 is the internet, and includes WWW (world wide web) server 10, ISDN communication net, a communication net 12 capable of data transmission such as a data communication net or a telephone net, and a terminal device 14.

While the network system 1 includes many WWW servers 10 and terminal devices 14 in actual environment, an exemplary case where the network system 1 comprises one WWW server 10 and one terminal device 14 is explained hereunder for the purpose of simplifying the description.

With these components, the network system 1 transmits HTML data described in HTML (hyper text markup language) and including data of a plurality of media including a text, a voice and an image to the terminal device 14.

As shown in FIG. 1, the terminal device 14 comprises a communication interface conforming to the communication net 12, a CPU, a memory, a keyboard and a hard disk (all not shown) and is further provided with a multimedia computer 16 (PC) executing a voice output processing software 160 implementing the voice output method of this invention, a key pad 18 used as an auxiliary input device including a normal mode key 180, a fast feed mode key 182 and other keys (ten keys, etc, not shown) and a voice output device 20 for outputting the voice synthesized by the computer 16 via a speaker (SP).

With these components, the terminal device 14 outputs text data contained in HTML data sent from the WWW server 10 which is converted to a voice signal of different speeds for different portions in response to users operation of the normal mode key 180 and the fast feed mode key 182.

Each component of the network system 1 is now described hereunder.

WWW Server 10

The WWW server 10 has a WWW function and sends HTML data requested from a terminal device 14 to another terminal device 14 via the communication net 12.

Communication Net 12

The communication net 12 transmits data between the WWW server 10 and the terminal device 14.

Computer 16

In the terminal device 14, the computer 16 receives the HTML data from the WWW server 10 via the communication net 12, displays image data and text data contained in the HTML data in a monitor device (not shown) and further converts the voice data contained in the HTML data to waveform data indicating the waveform of the voice signal for outputting (browser function).

Incidentally, the browser function of the computer 16 is implemented by a browser part 164 of the voice output processing software 160 of FIG. 2 to be described later.

The computer 16 also has a function to convert the text data contained in the HTML data to voice waveform data indicating the waveform of a voice which reads aloud the text data contained in the HTML data for outputting. For example, when a user depresses the normal mode key 180 of the key pad 18, the computer 16 converts the text data contained in the received HTML data to voice waveform data indicating a voice waveform of a normal speed (as fast as an announcer reads aloud news in a radio broadcasting) (normal mode).

When a transient time has not elapsed after the user depresses the fast feed mode key 182 of the key pad 18, the computer 16 converts the text data contained in the received HTML data to voice waveform data at a speed which is faster than the normal speed but slow enough for the user to follow the content [audible fast feed speed (first speed): 1.5 to 2 times the normal speed, for example] (fast feed mode) and outputs it.

When the transient time has elapsed after the user depressed the fast feed mode key 182 of the key pad 18, the computer 16 converts only a section which is useful for the user to grasp the content [audible fast feed section (first section)] to voice waveform data of the audible fast feed speed while converting other section (second section) to voice waveform data of a speed at which the user can grasp at least the length of the text data and the tone of the voice resulted from the conversion of the text data [skipping speed (second speed)] regardless of whether or not it is audible to the user (skipping mode).

As a specific example, in the skipping mode, the computer 16 reads aloud only the text data of a predetermined length of time from data indicating punctuation (punctuation data) of the text data such as a punctuation mark, carrier return, space and a start point of hyperlink at the audible fast feed speed as an audible fast feed section while reading aloud other portion of the text data at the skipping speed (3 to 15 times faster than the normal speed, for example) as a skipping section in response to a fast feed rate N (the number indicating a multiple of the normal speed in reading aloud the skipping section) which is set by the user.

Incidentally, the voice resulted from the skipping section of the text sounds like "quequeque . . . ." as if it is a voice reproduced in high speed in an analog tape recorder.

Each conversion mode of the text data to voice waveform data in the computer 16 described in the above is implemented in each component of the voice output processing software 160 to be described later with reference to FIG. 2 and the voice waveform data generated by the computer 16 is outputted to a voice output device 20.

Voice Output Device 20

The voice output device 20 comprises a digital/analog converter circuit, etc., and converts voice waveform data of a digital form inputted from the computer 16 to an analog voice signal for outputting it externally via a speaker.

Voice Output Processing Software 160

Figure 2:
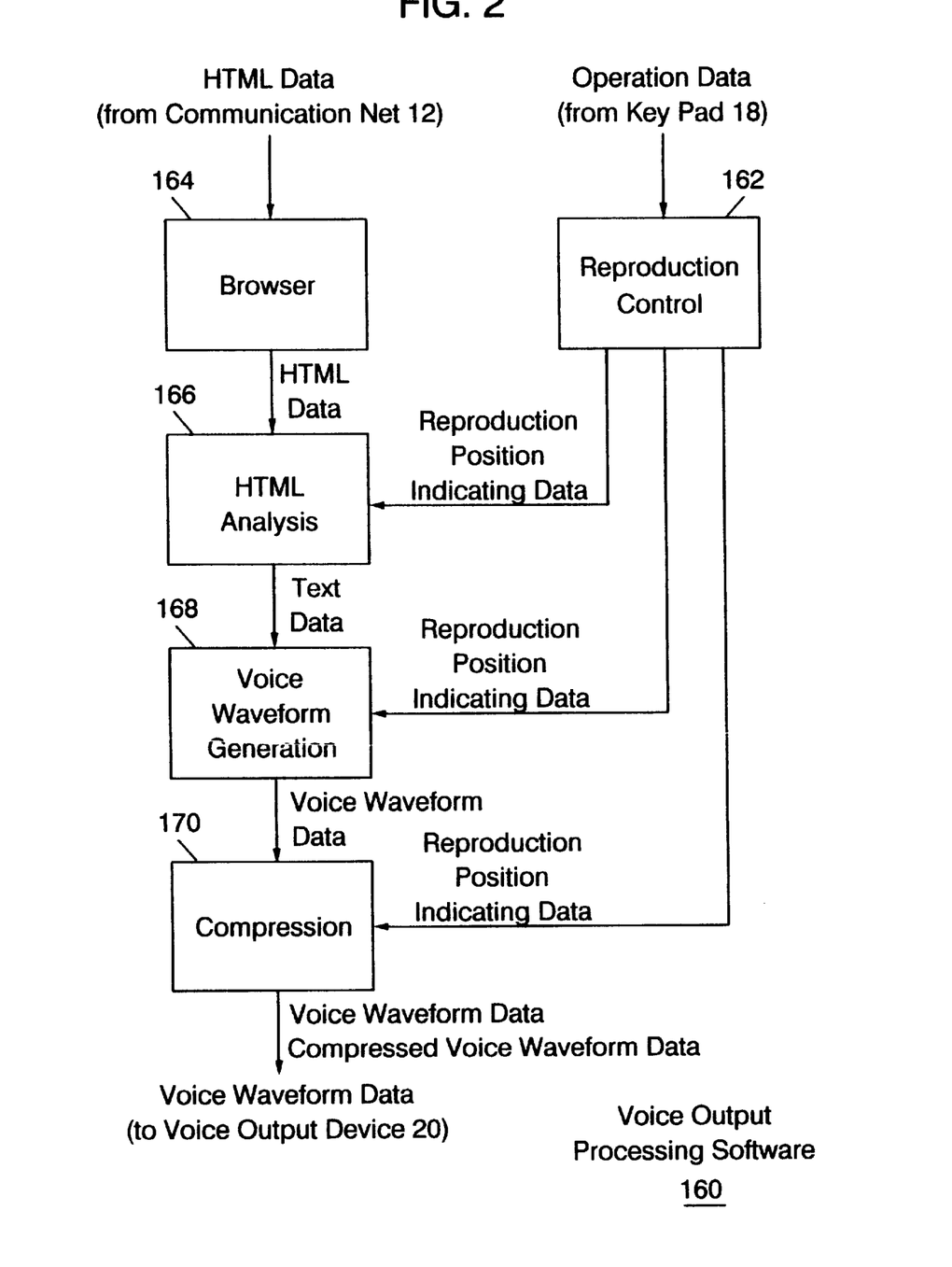
FIG. 2 is a diagram showing components of the voice output processing software shown in FIG. 1.

As shown in FIG. 2,.the voice output processing software 160 comprises a reproduction control part 162, a browser part 164, an HTML analyzing part 166, a voice waveform generating part 168 and a compression part 170.

Each component of the voice output processing software 160 is now described hereunder.

Reproduction Control Part 162

The reproduction control part 162 monitors users operation of the key pad 18, for example, the status of the normal mode key 180, fast feed mode key 182 and other buttons, that is, whether they are depressed or not depressed and controls the operation of the browser part 164, the HTML analyzing part 166, the voice waveform generating part 168 and the compression part 170.

Specifically, the reproduction control part 162 specifies to the HTML analyzing part 166 the portion to be voice outputted among the HTML data. When the fast feed mode key 182 is depressed to move to a fast feed mode during the time when the voice is outputted in the normal mode, for example, the reproduction control part 162 controls the HTML analyzing part 166 to cause the text data to be outputted from a point retrospecting from the portion which was voice outputted last.

The reproduction control part 162 sets the speed of voice signals. that is, data (speed data) indicating the number of phonetic characters of the text data per second to be converted to voice waveform data in the voice waveform generating part 168 when the content of the text is read aloud in the normal speed (normal mode) and audible fast feed speed (fast feed mode), respectively.

The reproducing control part 162 also set in the compression part 170 a wait time M indicating for how many seconds the text data after a punctuation data is voice outputted in the audible fast feed speed and a transient time P from the time when the fast feed mode key 182 is depressed to the time when the skipping mode is entered, both being set by a user.

Browser Part 164

The browser part 164 is a WWW browser software such as WebExplorer (trademark of IBM) or NetscapeNavigator (trademark of Netscape Communications Co.) which receives users operation, requests WWW server to send HTML data of WWW selected by the user, receives HTML data sent over the communication net 12 from the WWW server in response to the request and outputs it to the HTML analyzing part 166 to implement the browser function of the above described computer 16.

HTML Analyzing Part 166

The HTML analyzing part 166 analyzes HTML data inputted from the browser part 164 and outputs the portion of text data indicated by the reproduction control part 162 to the voice waveform generating part 168 by separating it from the HTML data.

Voice Waveform Generating Part 168

The voice waveform generating part 168 generates voice waveform data indicating a voice waveform which reads aloud a character string of text data inputted from the HTML analyzing part 166 at a speed indicated by speed data set by the reproduction control part 162 and outputs generated voice waveform data and a timing signal indicating the position of a punctuation data in the text data to the compression part 170.

In other words, the voice waveform generating part 168 generates voice waveform data which reads aloud the text data at the normal speed in the normal mode while generating voice waveform data which reads aloud the text data at the audible fast feed speed in the fast feed mode and the skipping mode and outputs them to the compression part 170 along with the timing signal.

Compression Part 170

The compression part 170 outputs voice waveform data of the normal speed and the audible fast feed speed inputted from the voice waveform generating part 168 to the voice output device 20 as it is in the normal and the fast feed modes.

In the skipping mode, the compression part 170 outputs the portion corresponding to the audible fast feed section of the text data in the voice waveform data inputted from the voice waveform generating part 168 to the voice output device 20 as it is and the portion corresponding to the skipping section of the text data in the voice waveform data to the voice output device 20 with compression.

In other words, after the transient time elapses while the fast feed mode key 182 of the key pad 18 is depressed and a skipping mode is entered, the compression part 170 outputs voice waveform data of the audible fast feed speed corresponding to each text data as it is from the time when the timing signal from the voice waveform generating part 168 indicates the time position of punctuation data to the time when the transient time P elapses (audible fast feed section). Further, after the skipping mode is entered, the compression part 170 compresses voice waveform data of the audible fast feed speed corresponding to the text data appearing after the time when the wait time M elapses from the time position of the punctuation data (skipping section) by 1/N in time by culling for example and outputs to the voice output device 20 after converting it to compressed voice waveform data at the skipping speed.

Operation of the Network System 1

The operation of the network system 1 is now described hereunder.

Processing by Voice Output Processing Software 160

Figures 3, 3A:
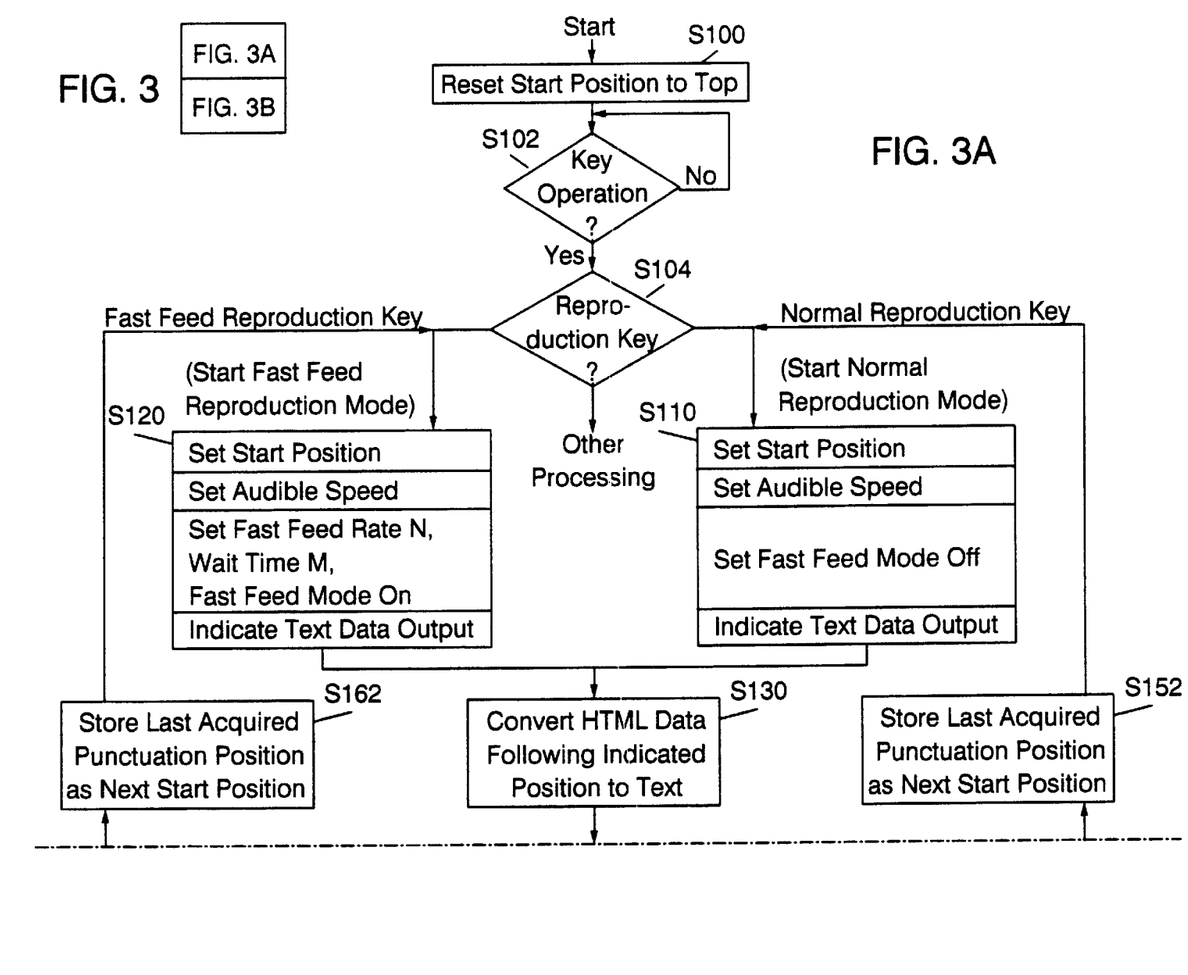
FIG. 3 is a flow chart showing the content of processing of the voice output processing software (FIG. 2) which is executed by a computer of the network system shown in FIG. 1.
Figure 3B:
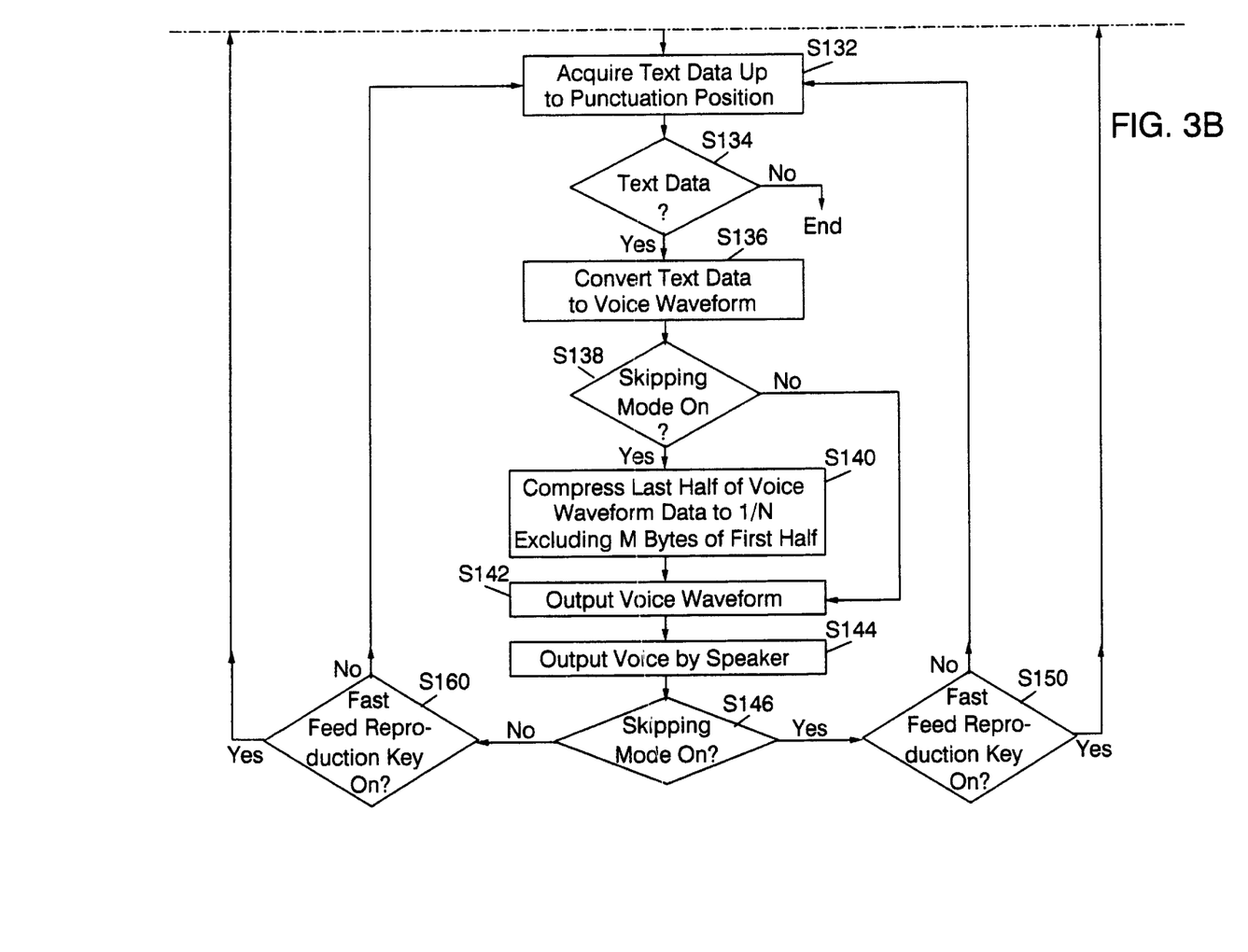

FIG. 3 is a flow chart showing the content of processing by the voice output processing software 160 (FIG. 2) which is executed by the computer 16 of the network system 1 shown in FIG. 1.

In the computer 16 (FIG. 1), when the browser part 164 of the voice output processing software 160 (FIG. 2) requests to WWW server 10 via the communication net 12 HTML data of WWW which the user desires in response to users operation of the key pad 18, etc., the WWW server 10 sends the requested HTML data to the terminal device 14 via the communication net 12.

The browser part 164 of the voice output processing software 160 receives the HTML data from the WWW server 10 and outputs it to the HTML analyzing part 166.

As shown in FIG. 3, the reproduction control part 162 stores the position to start voice output of the text data contained in the HTML data as a top position (initial value) in step 100 (S100).

In step 102 (S102), the reproduction control part 162 determines whether or not there is a key operation of the key pad 18 by the user (depression of the normal key 180, the fast feed mode key 182 and other keys). The reproduction control part 162 proceeds to processing in S104 only when there is a key operation of the key pad 18.

In step 104 (S104), the reproduction control part 162 determines whether the depressed key is the normal mode key 180 or the fast feed mode key 182. When the depressed key is the normal mode key 180, the reproduction control part 162 proceeds to S110 to start voice output processing of the normal mode while it proceeds to S120 when the depressed key is the fast feed mode key 182 to start voice output processing of the fast feed mode. otherwise, it performs other processing.

In step 110 (S110), the reproduction control part 162 sets the start position of the voice output of the text data in the HTML data stored in either one of processing of S100, S152, S162 in the HTML analyzing part 166, sets the normal speed in the voice waveform generating part 168 and sets the compression part 170 so as to voice output in the normal mode (fast feed mode is off).

Further, the reproduction control part 162 instructs the HTML analyzing part 166 to separate text data from the HTML data and output it to the voice waveform generating part 168 in the manner similar to the processing in S110.

In step 120 (S120), the reproduction control part 162 sets the start position of the voice output of the text data in the HTML data in the HTML analyzing part 166, sets the audible fast feed speed in the voice waveform generating part 168 and sets the mode in the compression part 170 so as to voice output in the fast feed mode (fast feed mode is on).

Further, the reproduction control part 162 instructs the HTML analyzing part 166 to separate text data from the HTML data and output it to the voice waveform generating part 168 in the manner similar to processing in S110.

In step 130 (S130), the HTML analyzing part 166 separates the text data following the voice output start position which is set and outputs to the voice waveform generating part 168 in accordance to indication by the reproduction control part 162.

In step 132 (S132), the voice waveform generating part 168 looks for a punctuation data of the text data inputted from the HTML analyzing part 166 and acquires the text data immediately after the point which was voice outputted last and up to the punctuation data.

In step 134 (S134), the voice waveform generating part 168 determines whether or not the text data was acquired and proceeds to S136 when the text data was acquired while it ends processing otherwise.

In step 136 (S136), the voice waveform generating part 168 generates voice waveform data which reads aloud the acquired text data at a speed set by the reproduction control part 162 and outputs it to the compression part 170 along with a timing signal indicating the time position of the punctuation data.

In step 138 (S138), the compression part 170 determines whether or not the wait time M has elapsed from the time position of the punctuation data indicated by the timing signal and proceeds to S140 when the wait time M has elapsed while proceeding to S142 otherwise.

In step 140 (S140), the compression part 170 compresses the voice waveform data inputted from the voice waveform generating part 168 by 1/N in time and outputs it to the voice output device 20 as compressed voice waveform data.

In step 142 (S142), the compression part 170 outputs the voice waveform data or the compressed voice waveform data to the voice output device 20.

In other words, after the skipping mode is entered, the compression part 170 outputs voice waveform data reading aloud the skipping section of the text data which is compressed by 1/N in time to the voice output device 20 while outputting the audible fast feed section of the text data to the voice output device 20 without compression.

Further, in the normal mode and the fast feed mode, the compression part 170 outputs the voice waveform data of normal speed or fast feed speed to the voice output device without compression as it is.

In step 144 (S144), the voice output device 20 converts the voice waveform data or the compressed voice waveform data to an analog voice signal and outputs it via the speaker.

In step 146 (S146), the reproduction control part 162 determines whether or not the compression part 170 is in the skipping mode and proceeds to processing in S150 if it is in the skipping mode while proceeding to processing in S160 if it is not in the skipping mode.

In step 150 (S150), the reproduction control part 162 determines whether or not the fast feed mode key 182 is depressed by the user and proceeds to processing in S132 if it is depressed while proceeding to processing in S152 if it is not depressed.

In step 152 (S152), the reproduction control part 162 stores the punctuation data which the voice waveform generating part 168 found last as the position of the text data at which the next voice output is started.

In step 160 (S160), the reproduction control part 162 determines whether or not the fast feed mode key 182 is depressed by the user and proceeds to processing in S162 if it is depressed while proceeding to processing in S132 if it is not depressed.

In step 162 (S162), the reproduction control part 162 stores the punctuation data which the voice waveform generating part 168 found last as the position of the text data at which the next voice output is started.

Operation of Terminal Device 14

The manner in which the user operates the terminal device 14 and what voice is outputted from the terminal device 14 is described hereunder in relation to processing by the voice output processing software 160.

First, the user receives HTML data from the WWW server using the browser function of the browser part 164 and depresses the normal mode key 189 of the key pad 18.

The HTML analyzing part 166 acquires, for example, the text data of the exemplary sentence shown in the table given below as a content from the HTML data received by the browser part 164 in response to the depression of the fast feed mode key 182 by the user.

Table 1

"For a blind person to utilize WWW: Is the internet, in particular, the WWW (World Wide Web) a closed world for a blind person? Many images including photographs and pictures are used beside texts in the WWW. A function of "Hyperlink" which displays the linked content when a part of the content displayed in the screen is selected is also widely used. While it is apt to be considered that a blind person can not utilize the function of the WWW, it is possible for the blind person to utilize the function of the WWW as well as a person having an eyesight does by the method introduced here. Introduced here is a configuration of an equipment and the use thereof when a blind person actually utilizes the WWW. (exemplary sentence)" . . . . (1)

Incidentally, it takes 52 seconds to read aloud this exemplary sentence at a normal speed while it takes 31 seconds if it is read aloud at the fast feed speed (in case of 1.7 times the normal speed). It is thus seen that it takes unexpectedly long time to read aloud text data when compared to reading it by an eye.

On the other hand, when the user continues to depress the fast feed mode key 182 over longer than the transient time P and enters the skipping mode, and assuming that the wait time M is 0.3 seconds, the audible fast feed speed is 1.5 times the normal speed and the skipping speed is 4 times the normal speed, the voice waveform generating part 168 and the compression part 170 output a character string of an audible fast feed section and a character string of a skipping section of the text data having the above exemplary sentence as its content in the manner shown in the table given below.

Table 2

"blind", ". . . . . . .",
"blind", ". . . . . . .",
"internet, in particular W", ". . . . . .",
"closed", ". . . . . .",
"WWW", ". . . . . .",
"text", ". . . . . .",
"photographs", ". . . . . .", "in the screen", ". . . . . .",
"these", ". . . . . .",
"blind", ". . . . . .",
"introduced here", " ", ". . . . . . .",
"blind", " ", ". . . . . .",
"eyesight", " ", ". . . . . .",
"here", " ", ". . . . . .",
"blind", " ", ". . . . . .", . . . . . (2)

For the purpose of simplifying explanation, the Table 2 shows the case where the transient time P is zero.

The characters within the quotation marks are character string of the audible fast feed section of the text data which is included in the wait time M following a punctuation data such as a punctuation mark and are voice outputted at the audible fast feed speed.

". . . . . ." shows that a character string of the skipping section of the text data is voice outputted at the skipping speed.

In this manner, by the voice output processing software 160, the text data in the audible fast feed section shown as a character string in the Table 2 is converted to voice waveform data of the audible fast feed speed and is outputted while the text data in the skipping section shown as ". . . . . ." is converted to compressed voice waveform data of the skipping speed at which the length of the character string and the tone can be grasped and outputted though it looks to the user to sound like "quequeque . . ." and the user can not understand the content.

Incidentally, the length of the time to voice output the text data is about 11 second in this condition.

Further, when the wait time M is 0.15 seconds and the skipping speed is 8 times the normal speed, the voice waveform generating part 168 and the compression part 170 voice output the character string of the audible fast feed section and the character string of the skipping section of the text data having the above exemplary sentence as a content in the manner as shown in the table given below.

Table 3
"blind", ". . . . . .",
"blind", ". . . . . .",
"inter", ". . . . . .",
"close", ". . . . . .",
"W", ". . . . . .",
"tex", ". . . . . .",
"photographs", ". . . . . .",
"screen", ". . . . . .",
"the", ". . . . . .",
"bli", ". . . . . .",
"here", ". . . . . .",
"bli", ". . . . . .",
"eye", ". . . . . .",
"here", ". . . . . .",
"bli", ". . . . . .", As in the Table 2, the Table 3 shows the case where the transient time P is zero for the purpose of explanation and characters within the quotation marks show the audible fast feed section of the text data while ". . . . . ." shows the character string of the skipping section of the text data.

In this manner, by the voice output processing software 160, the text data in the audible fast feed section shown as a character string in the Table 3 is converted to voice waveform data of the audible fast feed speed and is outputted while the text data in the skipping section shown as ". . . . . ." is converted to compressed voice waveform data of the sound "quequeque . . ." and outputted.

The length of the time to output the text data is only 7 seconds in this condition and is same as the time required for quickly reading the above exemplary sentence or shorter.

Figure 4:
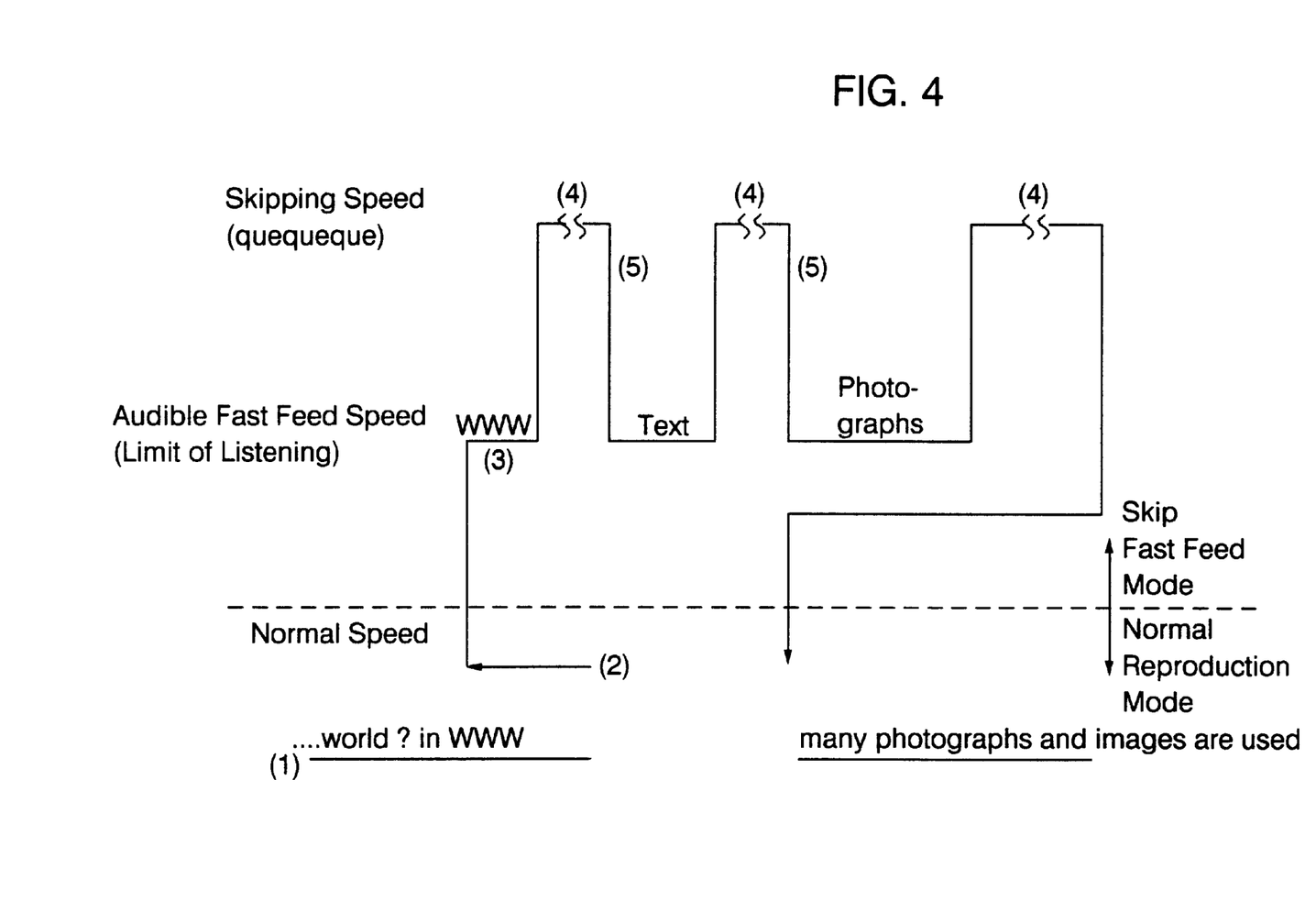
FIG. 4 is a diagram showing an example of a voice outputted by the terminal device shown in FIG. 1.

As described so far, the user listens to the content of the text data which is voice outputted alternatively at the audible fast feed speed and the skipping speed as shown in FIG. 4 (5).

Next, the user determines the portion to which the user should repeat listening at the normal speed and the audible fast feed speed [the character string of the portion of "world" and "many photographs and pictures are used" in the text data shown in FIG. 4, for example] based on the meaning of the character string which is voice outputted at an audible speed as shown in FIG. 4 (3) and the atmosphere of the voice which is outputted at the skipping speed as shown in FIG. 4 (4) and further determines the position of these portions in the text data from the length of the voice outputted at the skipping speed.

The user further specifies to the reproduction control part 162 an approximate position of a desired portion in the text data (character string shown by (1) in FIG. 4) by operating the key pad 18, etc., during the time when the user listens to the voice output of the text data as shown in FIG. 4 (6).

The reproduction control part 162 voice outputs the character string of the portion specified by the user in the text data at the normal speed or the audible fast feed speed by controlling the HTML analyzing part 166, . . . . . . . . , the compression part 170.

In this manner, the user can grasp the summary of the text data as if the user quickly reads the text data and repeats listening to only an important portion to understand the content by utilizing the skipping mode of the terminal device 14.

Further, because the user can set arbitrary wait time M, audible fast feed speed and skipping speed in the computer 16, the user can have the text data voice outputted at a speed depending on the content of the text data or a speed which is audible to the user to understand the content.

If it is attempted to voice output the exemplary sentence shown in the Table 1 simply at a constant high speed within about 11 seconds, for example, the speed of the voice has to be 4.2 times the normal speed. If it is attempted to voice output within about 7 seconds, the speed has to be 6.7 times the normal speed.

The user would be unable to follow the content of the voice at such high speed no matter how much he or she is trained.

However, with the voice output method in the network system 1, the user can grasp the content of the text data despite it is read aloud within such a short time.

While it was difficult for a person handicapped in eyesight to grasp the summary of a sentence at a speed at which a person having an eyesight reads the sentence, the voice output method in the network system 1 allows such handicapped person to gasp the summary of the sentence at a speed which looks as if the sentence is quickly read and to firmly understand an important portion skipping unnecessary portions in the sentence.

Accordingly, the work efficiency for a person handicapped in eyesight to grasp the content of a sentence is largely improved by the voice output method in the network system 1. For, example, when the voice output method in the network system 1 is used, even a beginner can grasp the content of the text data at a speed 4 times as fast as the normal speed at which the text data is read aloud while an expert would be able to grasp the content at a speed 7 times as fast as the normal speed.

Further, according to the voice output method in the network system 1, the text data can be voice outputted in both the fast feed mode and the skipping mode simply by adding the key pad 18 to the computer 16 as a device for user interface. Accordingly, even a user which is not familiar to a computer can operate very easily.

While it is difficult to implement the method of voice outputting the content of text data at a frequently changed speed in such manner in a device in which a recording medium has to be mechanically fed, such as a CD player and a tape recorder, it is very simple to implement such when a voice synthesizing technology is utilized.

The voice output method in the network system 1 may be further applied to an apparatus for voice outputting a digital text such as a so-called electronic book and other apparatuses beside voice output of text data which is contained in HTML data.

Further, by combining the voice output method in the network system 1 and a syntax analyzing technology for text data, a character string of nouns or a character string of words which is set by a user may be used as a punctuation data beside the punctuation marks, for example.

Further, by setting the wait time M to 0 second and the multiple N to 1 in the reproduction control part 162, the text data may be voice outputted in a simple fast feed mode without shifting to the skipping mode by using the terminal device 14.

As described in the above, the voice output apparatus and method of this invention allow reading aloud text data in a short time and supporting a user in grasping the content of the text data to fully coexist.

Further according to the voice output apparatus and method of this invention, when the text data is read aloud in a short time, a listener is caused to grasp which portion of the text data is being read aloud and given a hint of repeating listening to the important portion of the text data.

It should be understood that various modifications can be made by those skilled in the art without departing from the spirit and scope of the invention.

We claim:

1. A voice output apparatus comprising:
   dividing means for dividing text data into a plurality of first and second sections; and
   voice output means for converting the text data of each of said sections to a voice signal at speeds differing in the sections, said voice output means for converting said first sections of said divided text data to voice signals at a normal first speed while converting a first portion of said second sections of said divided text data to voice signals at a second fast forward speed which is faster than said first speed but still comprehensible and another portion at a third skipping speed above the limit of comprehension which portions are selected and combined so that the text can be audibly reviewed quickly and understandably.

2. A voice output apparatus of claim 1 in which;
   said text data comprises character strings of data and boundary data indicating the boundary between said plurality of character strings; and
   said dividing means divides said text data at the portion of said boundary data into said plurality of character strings of data and further divides said plurality of divided character strings of data into said first sections and said second sections.

3. A voice output apparatus of claim 2 in which; said dividing means divides a predetermined portion from the beginning of each of said plurality of divided character string of data into said first sections and divides a portion other than said predetermined portion from the beginning of each of said plurality of divided character string of data into said second sections.

4. The voice output apparatus of claim 1 including control means for an operator to divide the text data into the first and second sections.

5. The voice output apparatus of claim 4 wherein at least all of the text data is converted to voice signals in the first and second sections.

6. The voice output apparatus of claim 1 including second segment variation means to vary the size of or eliminate entirely the first portion of the second segments.

7. A voice output method comprising the steps of:
   dividing text data into first and second sections,
   converting each of said first and second sections to a voice signal of a speed differing in the first and second sections converting said first sections of said divided text data to a voice signal of a normal first speed while converting said second sections of said divided text data into voice data at different speeds in different portions one portion to a second fast forward speed which is faster than said first speed but still comprehensible and another portion to a third skipping speed beyond the limit of comprehension: and
   selecting and combining the sections and portions in segments that enable the text to be audibly comprehended quickly.

8. A voice output method of claim 7 in which;
   said text data comprises character strings of data and boundary data indicating the boundary between said plurality of character strings; and
   said dividing step includes a step of dividing said text data at the portion of said boundary data into said plurality of character strings of data and further dividing said plurality of divided character strings of data into said first sections and said second sections.

9. The voice output method of claim 7 including converting all said text data to voice signals in either the first or second sections.

10. The voice output method of claim 7 including permitting segments of said second sections initially audible at skipping speed to be reviewed at normal speed.

11. The voice output method of claim 7 including converting portions of the text data in the second sections at the beginning and end thereof to said voice second speed.

12. The voice output method of claim 11 including having portions of text data voiced at said second speed intervening portions of the text data voiced at the third speed in said second sections.

13. The voice output method of claim 11 wherein said second speed is 1.5 to three times the normal speed and said skipping speed is three or more times the normal speed.

14. A computer readable program on a recording medium with software for causing a computer to execute the steps of:
   dividing text data into first and second sections; and
   converting each of said first and second sections all to a voice signal at speeds differing from each other when audibly outputting them, converting said first sections of said divided text data to a voice signal at a normal first speed while converting said second sections of said divided text data to a voice signal of a second speed which is faster than said first speed and at least partially incomprehensible so that the total text data is converted to voice signals
   selecting and combining the sections to permit rapid understanding of the vocalized text data.

15. A compute readable recording medium of claim 14 in which;
   said text data comprises character strings of data and boundary data indicating the boundary between said plurality of character strings; and said dividing step includes a step of dividing said text data at the portion of said boundary data into said plurality of character strings of data and further dividing said plurality of divided character strings of data into said first sections and said second sections.

16. A computer readable recording medium of claim 15 in which;

a step of dividing a predetermined portion from the top of each of said plurality of divided character strings of data into said first sections; and a step of dividing a portion other than the predetermined portion from the top of each of said plurality of divided character strings of data into said second sections.

17. A readable computer program of claim 14 providing two different voice signal speeds in the second section one which is faster than the normal speed but still comprehensible and the other which is so fast as to be incomprehensible.

18. A computer readable recording medium of claim 14 in which:

said text data comprises character strings of data and boundary data indicating the boundary between said plurality of character strings; and said dividing step includes the steps of storing a last occurring boundary data and dividing operator commands said text data into said first sections and said second sections at the last occurring boundary data and a next occurring boundary data bracketing the operator commands.

* * * * *